United States Patent [19]

Hergenrother et al.

[11] 4,242,495
[45] Dec. 30, 1980

[54] POLYPHOSPHAZENE POLYMERS CONTAINING OXAZOLE AND THIAZOLE SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 71,650

[22] Filed: Sep. 4, 1979

[51] Int. Cl.³ ............................................. C08G 83/00
[52] U.S. Cl. ................................... 528/168; 528/374; 528/377; 528/392; 528/399
[58] Field of Search ............... 528/168, 374, 392, 399, 528/377

[56] References Cited

U.S. PATENT DOCUMENTS

| | | | |
|---|---|---|---|
| 4,179,553 | 12/1979 | Hergenrother et al. | 528/399 |
| 4,179,556 | 12/1979 | Hergenrother et al. | 528/392 |
| 4,182,837 | 1/1980 | Hergenrother et al. | 528/399 |

*Primary Examiner*—Wilbert J. Briggs, Sr.

[57] ABSTRACT

Polyphosphazene polymers are prepared which contain repeating units represented by the formulas:

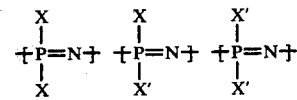

wherein X is the same or a mixture of different radicals represented by:

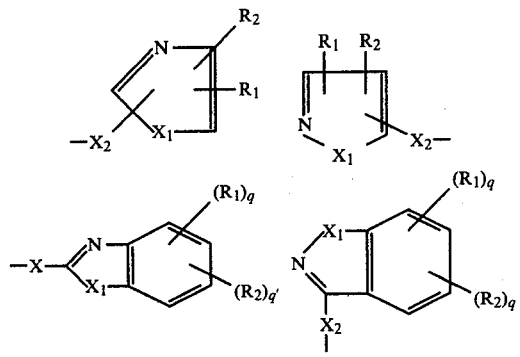

wherein $X_1$ is selected from the group consisting of —O— and —S—; $X_2$ is selected from the group consisting of —O—, —S—, —NH—, and —N(R)— where R is a lower alkyl radical; $R_1$ and $R_2$ are independently selected from a group consisting of hydrogen, chloro, bromo, cyano, nitro, alkylmercapto, dialkylamino, and substituted and unsubstituted alkyl, aryl, alkoxy and aryloxy radicals; the sum of (q+q') is an integer from 0 to 4; X' can be the same as X or can be selected from a group consisting of halogen and substituted and unsubstituted alkoxy, aryloxy, amino and mercapto radicals and mixtures thereof.

The polymers of the invention can be utilized in applications such as coatings, moldings, foams and the like.

20 Claims, No Drawings

POLYPHOSPHAZENE POLYMERS CONTAINING OXAZOLE AND THIAZOLE SUBSTITUENTS

BACKGROUND OF THE INVENTION

Polyphosphazene polymers containing repeating $+P=N+$ units in which various unsubstituted and substituted alkoxy, arlyoxy, amino and mercapto groups are attached to the phosphorus atom and their method of preparation are described in the prior art as illustrated in the publication, "Nitrogen-Phosphorus Compounds", Academic Press, New York, New York, 1972, by H. R. Allcock and "Poly (Organophosphazenes)", Chemtech, Sept. 19, 1975, by H. R. Allcock and in such U.S. Pat. Nos. as 3,515,688; 3,702,833; 3,856,712; 3,974,242 and 4,042,561, which are hereby incorporated by reference.

However, none of the aforementioned publications or patents or for that matter, none of the prior art of which the applicants are aware, discloses or suggests polyphosphazenes homopolymers or copolymers containing oxazole or thiazle containing substituents or to methods of preparing such polymers.

SUMMARY OF THE INVENTION

This invention relates to polyphosphazene homopolymers and copolymers containing repeating $+P=N+$ units in the polymer chain in which oxazole or thiazole containing substituents are attached to the phosphorus atom. The term oxazoles hereinafter includes oxazoles, isooxazoles, benzoxazoles and benzisoxazoles. The term thiazole hereinafter includes thiazoles, isothazoles, benzothiazoles and benzoisothiazoles. More particularly, the invention relates to polyphosphazene polymers having substituents derived from oxazole or thiazole compounds which are attached to the polyphosphazene backbone through an amino, mercapto, or oxy linkage and to a method of preparing such polymers. Optionally, any other substituent groups, such as alkoxy, aryloxy, amino and mercapto groups which are compatible with oxazole or thiazole group contains substituents and are known in the polyphosphazene state of the art may be substituted onto the polyphosphazene in addition to the oxazole or thiazole containing substituents. These optional substituents may be substituted onto the polyphosphazene by the method disclosed in the present invention or by prior art methods.

DETAILED DESCRIPTION OF THE INVENTION

The polymers of the invention contain repeating units represented by the formulas:

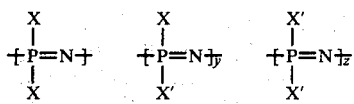

wherein X and X' are the same or different and are represented by:

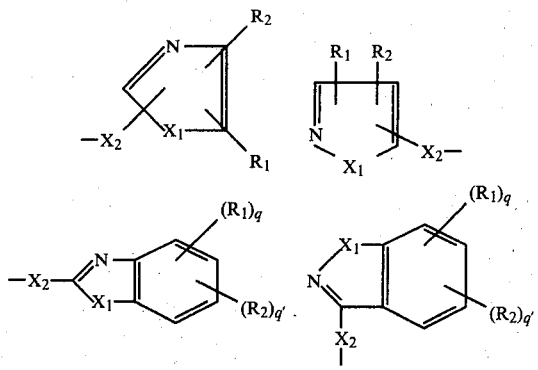

wherein $X_1$ is selected from the group consisting of —O— and —S—, $X_2$ is selected from the group consisting of —O—, —S—, —NH—, and —N(R)— where R is a lower alkyl group; $R_1$ and $R_2$ are independently selected from a group consisting of hydrogen, chloro, bromo, cyano, nitro, alkylmercapto, dialkylamino, substituted and unsubstituted alkyl, aryl, alkoxy and aryloxy radicals; the sum of $(q+q')$ is an integer from 0 to 4; X' can be a chloro radical or a substituted or unsubstituted alkoxy, aryloxy, amino or mercapto radical or a mixture of such radicals which are known in the state of the art in poly(phosphazene) technology and which are compatible with oxazole or thiazole group containing substituents. The polymer can contain from 20 to 50,000 of such units such that $20 \leq (w+y+z) \leq 50,000$. The various groups substituted on the oxazle and thiazole as well as X' groups can be substituted themselves with any "non-reactive" substituent, i.e., a substituent which is non-reactive with the various materials present during polymer formation. Suitable substituents include chloro, bromo, nitro, cyano, aryloxy, alkoxy, alkyl, aryl and the like.

One skilled in the art readily will recognize that steric hindrance will dictate the use of relatively bulky groups adjacent to the hydroxy, mercaptan or amino group on the oxazole or thiazole group, since, as set forth hereinafter, the polymers are made by reacting the hydroxy, mercaptan, or primary or secondary amino group on oxazle or thiazole ring with a chlorine atom on the polyphosphazene backbone. Desirably, groups which sterically inhibit this reaction should be avoided. With the foregoing proviso in mind, the selection of the $R_1$ and $R_2$ groups on the thiazole ring will be apparent to one skilled in the art.

Similarly when extremely bulky oxazole or thiazole group are substituted on the polyphosphazenes it is impossible to prepare pure homopolymers due to steric hindrance. With the foregoing proviso in mind, it will be apparent to one skilled in the art from which oxazole or thiazole group containing substituents homopolymers can not be formed such as methylaminobenzothiazole.

In the polymer units represented by the above formulas, all X substituent groups can be the same substituent or they can represent mixtures of different oxazole or thiazole groups. The X' substituent groups can be selected from the same groups as the X substituent group or they can represent chloro, alkoxy, aryloxy, amino or mercaptan groups or mixtures thereof.

When the term polymer is used herein it will include within its meaning both homopolymers and copolymers of substituted polyphosphazenes.

The phosphzene polymers of the invention can be represented by the formula:

$$[NP(X)_a(X')_b]_n$$

wherein n is from 20 to 50,000 and a+b=2, and a and b are greater than zero.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like, the copolymer should contain at least 5 mole percent by weight and preferably at least 10 mole percent by weight of the oxazole or thiazole group containing substituent.

While the copolymers which can be prepared in the present invention can contain 99 mole percent by weight and preferably 80 mole percent by weight of the oxazole or thiazole containing substituent, it should be apparent to one skilled in the art that bulky groups such as monoalkylaminothiazole substituents have a preferably upper substitution range of 50 mole percent by weight. Polyphosphazenes which contain over 99 percent by weight of one substituent are considered to be homopolymers for the purposed of the present invention.

Where the presence of crosslinking functionality is desired, in a polymer otherwise free of unsaturated crosslinking functionality, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,073,824; 4,083,825 and 4,076,658 which are hereby incorporated by reference and include $-OCH=CH_2$ and $-OR_3CF=CF_2$, as well as similar groups which contain unsaturation. Generally, when present the moieties containing crosslinking functionality are usefully present in an amount between about 0.1 mole percent and to about 50 mole percent and usually between about 0.5 mole percent to about 10 mole percent based on the replaceable chlorine in the starting poly(dichlorophosphazene). The crosslinking moieties are considered to fall within the scope of the term substituted alkoxy substituents as used in the claims.

The polymers can be used to prepare protective films and can be utilized in application such as moldings, coatings and the like.

METHOD OF PREPARATION

The polymers are prepared by reacting a poly(dichlorophosphazene) having the formula $-(NPCl_2)_n-$, in which n is from 20 to 50,000, in the presence of a tertiary amine with either a hydroxy, mercaptan, or primary or secondary amine containing oxazole or thiazole compound or a mixture of either or both of these compounds. Optionally, an additional compound or mixture of compounds which is reactive with the poly(dichlorophosphazene) in forming a copolymer with the oxazole or thiazole radicals on the backbone of the polyphosphazene can be incorporated into the reaction mix. Examples of the additional compounds used to form copolymers are illustrated in the section entitled, "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,202; 4,005,171; and 4,055,520 and the aforementioned publications of H. R. Allcock, the disclosures of which are incorporated herein by reference.

These polymers have the general formula $-(NPCl_2)_n-$, in which n may range from 20 to 50,000 or more. As described in the aforementioned references, the polymers are in general prepared by the thermal polymerization of cyclic oligomers having the formula $(NPCl_2)_m$, in which m is an integer from 3 to 7, with the cyclic trimer and tetramer often comprising up to 90 percent of the oligomers and the ratio of trimer to tetramer varying with the method of manufacture.

The specific conditions of temperature, pressure and time employed in the thermal polymerization of the cyclic oligomers can vary considerably depending on whether or not the polymerization is catalyzed. Thus, temperatures can range from about 130° C. to about 300° C., pressure can range from a vacuum of less than about $10^{-1}$ Torr to superatmospheric, and reaction times can range from about 30 minutes to about 48 hours.

A preferred process for preparing the poly(dichlorophosphazene) polymers used in the process in this invention is described in the aforementioned incorporated U.S. Pat. No. 4,005,171.

II. THE OXAZOLE AND THIAZOLE CONTAINING COMPOUNDS USEFUL IN FORMING THE POLYMERS OF THE INVENTION

The oxazole and thiazole containing compounds which can be employed in producing the polymers of the present invention include substituted and unsubstituted oxazoles, thiazoles, isoxazoles, isothiazoles, benzoxazoles, benzothiazoles, benzisoxazoles and benziathiazoles represented by the following structural formulas:

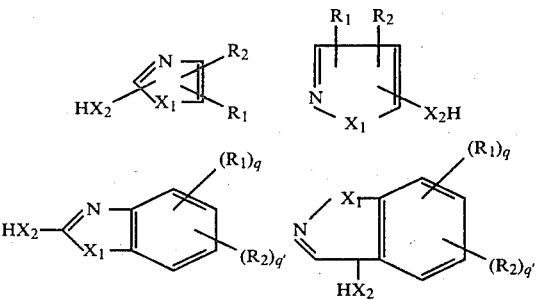

wherein X is selected from the group consisting of —O— and —S—; $X_2$ is selected from the group consisting of —O—, —S—, —NH—, and —N(R)— where R is a lower alkyl group; $R_1$ and $R_2$ are independently selected from a group consisting of hydrogen, chloro, bromo, cyano, nitro, alkylmercapto, dialkylamino, and substituted and unsubstituted alkyl, aryl, alkoxy, and aryloxy groups, and the sum of (q+q') is an integer from 0 to 4.

Illustrative examples of thiazoles which can be used to prepare the polymers of the present invention include: 2-mercaptothiazole, 2-hydroxythiazole, 2-aminothiazole, 2-methylaminothiazole, 2-mercapto-4, 5-dichlorothiazole, 2-mercapto-4-chloro-5-cyanothiazole, 2-mercapto-4-chloro-5-methylmercaptothiazole; 2-hydroxy-4-methoxythiazole, 2-hydroxy-4,5-dichlorothiazole, 2-hydroxy-4-bromo-5-methylthiazole, 2-hydroxy-4-cyano-5-phenylthiazole, 2-amino-4,5-dichlorothiazole, 2-amino-4-nitro-5-methylthiazole, 2-amino-4,5-dimethylthiazole, 2-amino-4-dimethylaminothiazole, 2-amino-4-chloro-5-cyanothiazole, 2-methylamino-4-chlorothiazole, 2-methylamino-4-,5-dimethylthiazole, 2-ethylamino-4-methoxy-5-chlorothiazole, 4-mercaptothiazole, 5-dichloro-4-mercaptothiazole, 4-mercapto-5-cyano-thiazole, 2-phenyl-4-mercaptothiazole, 5-mercaptothiazole, 2,4-dimethyl-5-mercaptothiazole, 2-methyl-4-nitro-5-mercaptothiazole, 4-hydroxythiazole, 4-hydroxy-5-methylthiazole, 2-chloro-4-hydroxy-5-ethylthiazole, 5-hydroxythiazole, 2,4-dicyano-5-hydroxythiazole, 2,4-dibromo-5-hydroxythiazole, 4-aminothiazole, 2,5-dimethyl-4-aminothiazole, 2-chloro-4-amino-5-ethylthiazole, 5-aminothiazole, 2-phenyl-4-chloro-5-aminothiazole, 2-ethyl-4-propyl-5-aminothiazole and the like.

Illustrative examples of isothiazoles which can be used to prepare the polymers of the present invention include: 3-mercapto-4,5-dichloroisothiazole, 3-mercapto-4-cyano-5-methylmercaptoisothiazole, 3-mercapto-4-methyl-isothiazole, 3-mercapto-4-nitro-5-chloroisothiazole, 4-mercaptoisothiazole, 3,5-dichloro-4-mercaptoisothiazole, 4-mercapto-5-cyano-isothiazole, 5-mercaptoisothiazole, 3,4-dimethyl-5-mercaptoisothiazole, 3-hydroxyisothiazole, 3-hydroxy-4-chloroisothiazole, 3-hydroxy-4,5-dicyanoisothiazole, 3-hydroxy-4-methoxy-5-chloroisothiazole, 4-hydroxyisothiazole, 3,5-dimethyl-4-hydroxyisothiazole, 5-hydroxyisothiazole, 3,4-dimethyl-5-hydroxyisothiazole, 3-chloro-4-methyl-5-hydroxyisothiazole, 3-aminoisothiazole, 3-amino-4,5-dichloroisothiazole, 3-amino-4-cyano-5-methylisothiazole, 4-aminoisothiazole, 3,5-dichloro-5-aminoisothiazole, 4-amino-5-cyanoisothiazole, 4-amino-5-methoxyisothiazole, 5-aminoisothiazole, 3-methylmercapto-4-methyl-5-aminoisothiazole, 3,4-dibromo-5-aminoisothiazole, 3-methylaminoisothiazole, 3-methylamino-4-methylmercapto-5-chloroisothiazole, 4-methylaminoisothiazole, 3,5-dichloro-4-methylaminoisothiazole, 5-methylaminoisothiazole, 3,4-dimethoxy-5-methylaminoisothiazole and the like.

Illustrative examples of benzothiazoles which can be used to prepare the polymers of the present invention include: 2-hydroxybenzothiazole, 2-hydroxy-4-methylbenzothiazole, 2-hydroxy-4-propylbenzothiazole, 2-hydroxy-5-methoxybenzothiazole, 2-hydroxy-4,5-dichlorobenzothiazole, 2-hydroxy-4,6-diethoxybenzothiazole, 2-hydroxy-4,5,6,7-tetrachlorobenzothiazole, 2-hydroxy-5-phenylbenzothiazole, 2-mercaptobenzothiazole, 2-mercapto-5,6-diphenoxybenzothiazole, 2-mercapto-4,5,6,7-tetrabromobenzothiazole, 2-mercapto-5,6-dicyanobenzothiazole, 2-mercapto-5,6-dimethylmercaptobenzothiazole, 2-mercapto-4-methyl-5-ethoxy-benzothiazole, 2-aminobenzothiazole, 2-amino-5,6-dichlorobenzothiazole, 2-amino-5-dimethylaminobenzothiazole, 2-amino-4,5,6,7-tetrabromobenzothiazole, 2-methylaminobenzothiazole, 2-methylamino-5,6-dicyanobenzothiazole, 2-methylamino-4-methoxybenzothiazole, and the like.

Illustrative examples of benzoisothiazoles which can be used to prepare the polymers of the present invention include: 3-hydroxybenzisothiazole, 3-hydroxy-5-methylbenzisothiazole, 3-hydroxy-5-, 6-diethylbenzisothiazole, 3-hydroxy-5,6-dichlorobenzisothiazole, 3-hydroxy-5,6-diphenylbenzisothiazole, 3-mercaptobenzisothiazole, 3-mercapto-4,5,6,7-tetrachlorobenzisothiazole, 3-mercapto-5,6-dicyanobenzisothiazole, 3-mercapto-5,6-dimethoxybenzisothiazole, 3-aminobenzisothiazole, 3-amino-5,6-dimethylbenzisothiazole, 3-amino-4,5,6,7-tetrachlorobenzisothiazole, 3-amino-5-phenoxybenzisothiazole, 3-methylaminobenzisothiazole, 3-methylamino-4,5,6,7-tetrachlorobenzisothiazole and the like.

The preferred thiazole containing compounds for use in preparing the polymers of the present invention are 2-mercaptothiazole, 2-mercaptobenzothiazole and 3-mercaptobenzisothiazole.

Illustrative examples of oxazoles which can be used to prepare the polymers of the present invention include: 2-hydroxyoxazole, 2-hydroxy-4,5-dichlorooxazole, 2-hydroxy-4,5-dimethyloxazole, 2-hydroxy-4,5-diphenyloxazole, 2-hydroxy-4,5-dicyanooxazole, 2-hydroxy-4-methylmercaptooxazole, 2-hydroxy-4-dimethylaminooxazole, 2-hydroxy-4,5-dinitrooxazole, 2-aminooxazole, 2-amino-4,5-dimethyloxazole, 2-amino-4,5-diphenyloxazole, 2-amino-4,5-diphenoxyoxazole, 2-amino-4,5-dichlorooxazole, 2-methylaminooxazole, 2-methylamino-4,5-dichlorooxasole, 2-mercapto-4,5-dimethylmercaptooxazole, 2-mercapto-4-methyloxazole, 2-mercapto-4,5-dicyanooxazole, and the like; 3-hydroxy-isoazole, 3-hydroxy-4,5-dibromooxazole, 3-hydroxy-4-methylisoxazole, 3-hydroxy-4,5-dimethylaminoisoxazole, 3-amino-4-nitroisoxazole, 3-amino-4,5-diphenylisoxazole, 3-amino-4,5-diphenoxyisoxazole, 3-methylaminoisoxazole, 3-methylamino-4,5-dichloroisoxazole, 3-mercapto-dimethylmercaptoisoxazole, 3-mercapto-4,5-dimethylisoxazole and the like; 2-hydroxybenzooxazole, 2-hydroxy-5,6-dichlorobenzoxazole, 2-hydroxy-5-methylbenzosazole, 2-hydroxy-5-nitrobenzoxazole, 2-aminobenzoxazole, 2-amino-4,5,6,7-tetrachlorobenzoxazole, 2-amino-5-cyano-benzoxazole, 2-amono-5,6-dimethylbenzoxazole, 2-methylaminobenzoxazole, 2-ethylaminobenzoxazole, 2-methylaminobenzoxazole, 2-ethylaminobenzoxazole, 2-methylamino-4,5,6,7-tetrachlorobenzoxazole, 2-mercaptobenzoxazole, 2-mercapto-4,5,6,7-tetrabromobenzoxazole, 2-mercapto-5,6-dimethoxybenzoxazole and the like; 3-hydroxybenzisoxazole, 3-hydroxy-4,5,6,7-tetrachlorobenzisoxazole, 3-hydroxy-5,6-dimethylbenzisoxazole, 3-aminobenzisoxazole, 3-amino-4,5,6,7-tetrachlorobenzisoxazole, 3-amino-4,5,6,7-tetrabromobenzisoxazole, 3-amino-5,6-dimethoxybenzisoxazole, 3-methylaminobenzisoxazole, 3-methylamino-4,5,6,7-tetrachlorobenzisoxazole, 3-ethylamino-5,6-dicyanobenzisoxazole, 3-propylaminobenzisoxazole, 3-mercaptobenzisoxazole, 3-mercapto-5,6-dimethylmercaptobenzisoxazole, 3-mercapto-4,5,6,7-tetrachlorobenzisoxazole and the like.

The preferred oxazole compounds for preparing the polymers of the present invention are 2-mercaptooxazole, 2-hydroxyoxazole, 2-amino-oxazole, 2-mercaptobenzoxazole and 2-mercaptobenzisoxazole.

III. ADDITIONAL REACTIVE COMPOUNDS

As indicated heretofore, the polyphosphazene copolymers of the invention in addition to the oxazole or thiazole containing substitutent groups can contain halogen radicals such as chloro groups, substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having from 1 to 20 carbon atoms such as methanol, ethanol, propanol, isopropanol, n-butanol, secbutanol, hexanol, dodecanol, and the like; fluoroalcohols, especially those represented by the formula $Z(CF_2)_nCH_2OH$ in which Z is hydrogen or fluorine and n is an integer from 1 to 10 as illustrated by trifluoroethanol; 2,2,3,3,3-pentafluoropropanol; 2,2,3,3,4,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol and the like. In instances where it is desired to incorporate mixed X' substituent groups in the copolymer, mixtures of the foregoing alcohols can be employed.

Aryloxy groups (substituted or unsubstituted) derived from aromatic alcohols including among others phenol; alkylphenols such as cresols, xylenols, p-, o-, and m-ethyl and propyl phenols and the like; halogen-substituted phenols such as p-, o-, and m-chloro and bromophenols and di- or tri-halogen substituted phenols and the like; and alkoxy-substituted phenols such as 4-methoxyphenol, 4-(n-butoxy)-phenol and the like. Mixtures of the foregoing aromatic alcohols can also be employed.

Amino groups derived from any of the amino compounds heretofore employed in the polyphosphazene polymer art. Thus, the amino groups may be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al. (hereby incorporated by reference) may be utilized. Representative of suitable mercaptan compounds as described in the aforementioned patent are methyl mercaptan and its homologs, ethyl, propyl, butyl, aryl and hexyl mercaptan, thiophenol, thionaphthols, benzyl mercaptan, cyclohexyl mercaptan and the like.

IV. THE TERTIARY AMINE

The use of tertiary amines in preparing the polymers of the invention minimizes undesirable side reactions and at the same time acts as an effective acid scavenger.

Tertiary amines which can be employed in preparing the polymers of the invention are those represented by the general structure:

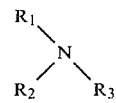

wherein $R_1$, $R_2$ and $R_3$ can each be alkyl containing from 1 to 8 carbon atoms. Thus, for example, the tertiary amine can be a trialkyl amine such as trimethylamine, triethylamine, trisiopropylamine, tri-n-propylamine, tri-isobutylamine, tri-n-butylamine, and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine; N-methyl morpholine; n-methyl pyrrole; 1,4-diaza-bicyclo(2.2.2) octane (DABCO) and dipiperidyl ethane.

As indicated above, the polymers of the present invention are prepared by reacting the poly(dichlorophosphazene) polymer and the oxazole or thiazole compound in the presence of a tertiary amine. Optionally, compounds listed in the group of "Additional Reactive Compounds," and which can be substituted onto the poly(dichlorophosphazene) in the presence of a tertiary amine can be employed in the reaction mix.

The specific reaction conditions and proportion of ingredients employed in preparing these polymers can vary somewhat depending on factors such as the reactivity of the specific oxazole or thiazole containing compound utilized, the particular tertiary amine employed, and degree of substitution desired in the finished polymer. In general, reaction temperature can range from about 25° C. to about 200° C. and reaction times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantial conversion of the chlorine atoms in the polymer to the corresponding oxazole or thiazole substituent and the formation of a substantially hydrolytically stable polymer.

The above reaction is ordinarily carried out in the presence of a solvent. The solvent employed in the reaction should be a solvent for the poly(dichlorophosphazene) polymer, the oxazole or thiazole containing compound and the tertiary amine. Examples of suitable solvents which may be employed include diglyme, triglyme, tetraglyme, cyclohexane, chloroform, dioxane, dioxolane, methylene chloride, toluene, xylene, and tetrahydrofuran. The amount of solvent is not critical and any amount sufficient to solubilize the reaction mixture material can be employed. In addition the materials in the reaction zone should be reasonably free of water. The prevention of substantial amount of water in the reaction system is necessary in order to inhibit the undesirable side reaction of the available chlorine atoms in the chloropolymer. Preferably the reaction mixture should contain less than about 0.01 percent water.

In general, the amount of oxazole or thiazole containing compound and if present, the other compounds which are substitutionally reactive with poly(dichlorophosphazene) employed in the process should be at least molecularly equivalent to the number of available chlorine atoms in the starting polymer. However, if desired, an excess of such compounds may be employed in order to insure substantially complete reaction of all the available chlorine atoms.

While the oxazole or thiazole-substituted poly(phosphazene) polymers and copolymers of the present invention have been prepared in the above-identified manner, that is, in the presence of a tertiary amine, alternative methods of preparation are available for preparation of the copolymer.

The prior art methods of poly(dichlorophosphazene) substitution such as by reaction with sodium alkoxide as demonstrated in U.S. Pat. No. 3,370,020 to Allcock et al., may be used to prepare some of the phosphazene polymers of the present invention. Preferably, the prior art methods may be used to partially substitute the poly(dicholorophosphazene) with the substituents derived from the compounds listed in the list of additional reactive compounds. The remaining chlorines on the partially substituted poly(dichlorophosphazene) are then replaced with oxazole or thiazole containing groups using the tertiary amine substitution process thereby forming a copolymer. Vice versa and preferably, the tertiary amine substitution process can be used to substitute the oxazole or thiazole groups before the prior art methods are used.

The following example is submitted for the purpose of further illustrating the nature of the present invention and are not intended as a limitation on the scope thereof. Parts and percentages referred to in the example and throughout the specification are by weight unless otherwise indicated. All temperatures are degrees Centigrade unless otherwise specified.

EXAMPLE 1

A 10-ounce bottle was charged with 7.36 gms (44 millimoles) of technical grade 2-mercapto-benzothiazole, 100 cc of tetrahydrofuran (hereinafter THF), 12.33 cc (88 millimoles) of triethylamine, 3.2 cc (44 millimoles) of 1,1,1-trifluoroethanol, and 13.9 gms (40.7 millimoles) of a 33.9% cyclohexane solution of poly(dichlorophosphazene).

The bottle and its contents were heated at 120° C. for 20 hours and then cooled. The reaction mixture in the bottle was subjected to Infrared spectroscopy, and no P-Cl band at 600 cm$^{-1}$ were detected by I.R. The reaction mixture was then coagulated in methanol to yield 10.67 gms of a brown rubbery polymer having the following elemental analysis:

|  | C | H | N | P | Cl | S |
|---|---|---|---|---|---|---|
| Actual (%) | 39.93 | 3.77 | 8.35 | 9.71 | 0.85 | 18.22 |
| Calculated (%)[1] | 39.00 | 3.09 | 9.85 | 10.56 | 2,48 | 18.79 |

[1]Based on 9.6% Triethylamine hydrochloride, 47.3% trifluoroethanol derivative, and 55.3% mercaptobenzothiazole derivative.

EXAMPLE 2

A 10 ounce bottle was charged with 12.3 cc (88 millimoles) of triethylamine, 4.43 cc (44 millimoles) of p-chlorophenol, 33.20 gms (40.1 millimoles) of a 14.0% solution of polydichlorophosphazene in cyclohexane, and 8.37 (50 millimoles of 2-mercaptobenzothiazole in 100 cc of THF which has been purified by passing it through an activated alumina column.

The bottle and its contents were heated at 120° C. for 20 hours and subsequently subjected to Infrared spectroscopy which detected the complete loss of the P-Cl band at 600 cm$^{-1}$ and the formation of new bands at 540 cm$^{-1}$, 516 cm$^{-1}$ and 498 cm$^{-1}$. The reaction mixture was coagulated in methanol to yield 12.98 gms of a tan rubbery polymer.

EXAMPLE 3

A 10 ounce bottle was charged with 8.12 gms (44 millimoles) of 2-amino-6-chlorobenzothiazole, 100 cc of THF, 4.43 cc (44 millimoles) of p-chlorophenol, 12.3 cc (88 millimoles) of triethylamine, and 33.12 gms (40.0 millimoles) of a 14% solution of polydichlorophosphazene in cyclohexane.

The reaction mix was given the same treatment as in Example 2. The I.R. analysis showed a loss of the P-Cl band at 600 cm$^{-1}$ and the formation of new bands at 588 cm$^{-1}$, 562 cm$^{-1}$, 546 cm$^{-1}$, and 509 cm$^{-1}$. Coagulation of the reaction mix in methanol yielded 12.95 gms of a white powdery material.

EXAMPLE 4

A 10 ounce bottle was charged with 6.65 gms (44 millimoles) of 2-mercaptobenzoxazole, 100 cc of THF, 12.3 cc (88 millimoles) of triethylamine, 4.43 cc (44 millimoles) of p-chlorophenol and 35.7 gms (40.0 millimoles) of a 13% solution of polydichlorophosphazene in cyclohexane.

The bottle and its contents were heated at 120° C. for 68 hours and then cooled. The reaction mixture in the bottle was subjected to I.R. analysis which detected the total loss of the P-Cl band at 600 cm$^{-1}$ and the formation of new bands at 539 cm$^{-1}$, 510 cm$^{-1}$, and 488 cm$^{-1}$. The reaction mixture was coagulated in methanol to yield 11.69 gms of a brown polymer having plastic-like characteristics.

We claim:

1. A polyphosphazene polymer containing units represented by the formulas:

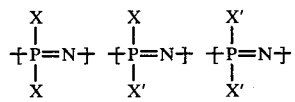

wherein X is the same or a mixture of different radicals represented by:

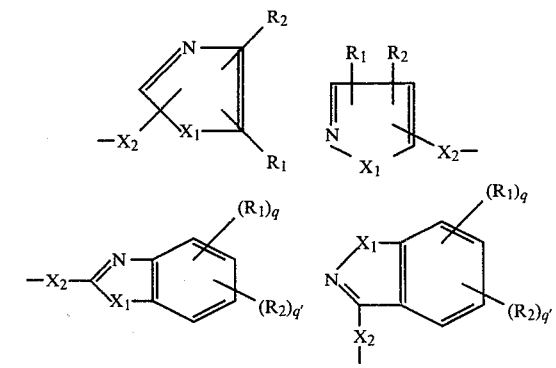

wherein $X_1$ is selected from the group consisting of —O— and —S—; $X_2$ is selected from the group consisting of —O—, —S—, —NH—, and —N(R)— where R is a lower alkyl radical; $R_1$ and $R_2$ are independently selected from a group consisting of hydrogen, chloro, bromo, cyano, nitro, alkylmercapto, dialkylamino, and substituted and unsubstituted alkyl, aryl, alkoxy and aryloxy radicals; the sum of (q+q') is an integer from 0 to 4; X' can be the same as X or can be selected from a group consisting of halogen and substituted and unsubstituted alkoxy, aryloxy, amino and mercapto radicals and mixtures thereof.

2. The polymer of claim 1 wherein the units of the polyphosphazene polymer are randomly distributed.

3. The polymer of claim 1 in which X is derived from substituted and unsubstituted 2-mercaptobenzothiazole.

4. The polymer of claim 3 in which X' is selected from the group consisting of —OCH$_2$CF$_3$, —OC$_6$H$_4$-p-Cl and mixtures thereof.

5. The polymer of claim 1 in which X is selected from a group consisting of substituted and unsubstituted 2-aminobenzothiazole, 2-hydroxybenzothiazole, 2-methylaminobenzothiazole, and mixtures thereof.

6. The polymer of claim 5 in which X' is selected from a group consisting of —OCH$_2$CF$_3$, —OC$_6$H$_4$-p-Cl and mixtures thereof.

7. The polymer of claim 1 in which X is derived from a compound selected from the group consisting of substituted and unsubstituted 2-mercaptobenzoxazole, 2-hydroxybenzoxazole, 2-aminobenzoxazole, 2-methylaminobenzoxazole and mixtures thereof.

8. The polymer of claim 7 in which X' is selected from the group consisting of —OCH$_2$CF$_3$, —OC$_6$H$_4$-p-Cl and mixtures thereof.

9. The polymer of claim 1 in which X is derived from a group consisting of substituted and unsubstituted 3-hydroxybenzisothiazole, 3-mercaptobenzisothiazole, 3-aminobenzisothiazole and 3-methylaminobenzisothizaole.

10. The polymer of claim 1 in which X is derived from a group consisting of substituted and unsubstituted 2-hydroxyoxaxole, 2-mercapto-oxazole, 2-amino-oxazole, 2-methylamino-oxazole and mixtures thereof.

11. The polymer of claim 1 in which X is derived from a compound selected from a group consisting of substituted and unsubstituted 3-hydroxyisoxazole, 3-mercapto-isoxazole, 3-amino-isoxazole, 3-methylamino-isoxazole and mixtures thereof.

12. The polymer of claim 1 in which X is derived from a compound selected from the group consisting of substituted and unsubstituted 3-mercapto-isothiazole, 3-hydroxy-isothiazole, 3-amino-isothiazole, 3-methylamino-isothiazole and mixtures thereof.

13. A method of preparing polyphosphazene polymers containing units represented by the formulas:

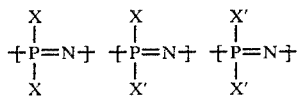

wherein X is the same or a mixture of different radicals represented by:

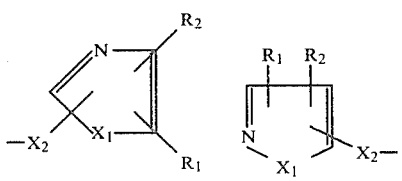

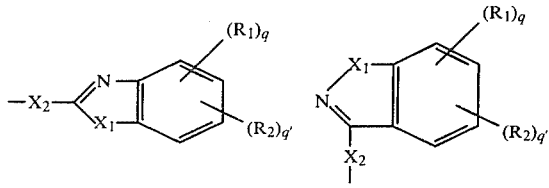

wherein X, is selected from the group consisting of —O— and —S—; X$_2$ is selected from the group consisting of —O—, —S—, —NH—, and —N(R)— where R is a lower alkyl radical; R$_1$ and R$_2$ are independently selected from a group consisting of hydrogen, chloro, bromo, cyano, nitro, alkylmercapto, dialkylamino, and substituted and unsubstituted alkyl, aryl, alkoxy and aryloxy radicals; the sum of (q+q') is an integer from 0 to 4; X' can be the same as X or can be selected from a group consisting of halogen and substituted or unsubstituted alkoxy, aryloxy, amino and mercapto radicals and mixtures thereof; said method comprising reacting a poly(dichlorophosphazene) polymer having a formula $+NPCl_2+_n$, wherein n is from 20 to 50,000, with one or more heterocyclic ring compounds selected from the group consisting of mercapto, hydroxy, amino or alkylamino substituted thiazole, isothiazole, benzothiazole, benzisothiazole, oxazole, isoxazole, benzoxazole, benzisoxazole or a mixture of one or more of the heterocyclic ring compounds and an additional compound or a mixture of additional compounds selected from the group consisting of substituted and unsubstituted alkanols, aromatic alcohols, amines, mercaptans, and mixtures thereof in the presence of a tertiary amine.

14. The method of claim 13 wherein the heterocyclic ring compound is selected from the group consisting of 2-mercaptobenzothiazole, 2-amino-6-chlorobenzothiazole.

15. The method of claim 13 wherein one or more of the additional compounds is selected from the group consisting of trifluoroethanol and p-chlorophenol.

16. The method of claim 13 wherein the heterocyclic ring compound is selected from the group consisting of substituted and unsubstituted 2-aminobenzothiazole, 2-hydroxybenzothiazole, 3-mercaptobenzisothiazole, 3-aminobenzisothiazole, 3-methylaminobenzisothiazole, 2-mercaptothiazole, 2-aminothiazole, 2-methylaminothiazole, 2-hydroxythiazole.

17. The method of claim 13 wherein the heterocyclic ring compound is selected from the group consisting of substituted and unsubstituted 2-mercapto-oxazole, 2-hydroxy-oxazole, 2-amino-oxazole, 2-methylaminooxazole.

18. The method of claim 13 wherein the heterocyclic ring compound is selected from the group consisting of 3-mercaptobenzoxazole, 2-aminobenzoxazole, 2-methylaminobenzoxazole, and 2-hydroxybenzoxazole.

19. The method of claim 13 wherein the heterocyclic ring compound is selected from the group consisting of substituted and unsubstituted 3-mercapto-isoxazole, 3-amino-isoxazole, 3-methylamino-isoxazole, 3-hydroxy-isoxazole, 3-mercaptobenzisoxazole, 3-aminobenzisoxazole, 3-methylaminobenzisoxazole, and 3-hydroxybenzisoxazole.

20. The method of claim 13 wherein the tertiary amine is triethylamine.

* * * * *

UNITED STATES PATENT OFFICE
CERTIFICATE OF CORRECTION

Patent No. 4,242,495              Dated December 30, 1980

Inventor(s) William L. Hergenrother & Adel F. Halasa

It is certified that error appears in the above-identified patent and that said Letters Patent are hereby corrected as shown below:

In the ABSTRACT, right-hand column bearing the formulas, the bottom formula should read "$X_2$" instead of -- X --. Thus

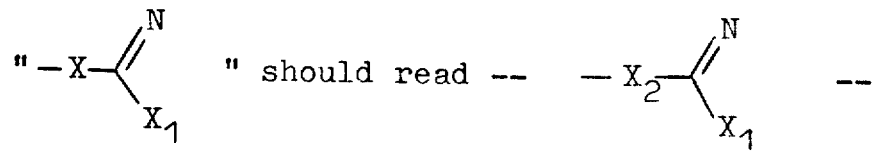

Column 4, line 9

"3,370,202" should read -- 3,370,020 --

Signed and Sealed this

Seventeenth Day of March 1981

[SEAL]

Attest:

RENE D. TEGTMEYER

Attesting Officer     Acting Commissioner of Patents and Trademarks